US008965766B1

(12) United States Patent
Weinstein et al.

(10) Patent No.: US 8,965,766 B1
(45) Date of Patent: Feb. 24, 2015

(54) SYSTEMS AND METHODS FOR IDENTIFYING MUSIC IN A NOISY ENVIRONMENT

(75) Inventors: Eugene Weinstein, New York, NY (US); Boulos Harb, New York, NY (US); Anaya Misra, New York, NY (US); Michael Dennis Riley, New York, NY (US); Pavel Golik, Aachen (DE); Alex Rudnick, Bloomington, IN (US)

(73) Assignee: Google Inc., Mountain View, CA (US)

( * ) Notice: Subject to any disclaimer, the term of this patent is extended or adjusted under 35 U.S.C. 154(b) by 357 days.

(21) Appl. No.: 13/421,821

(22) Filed: Mar. 15, 2012

(51) Int. Cl.
*G10L 15/04* (2013.01)
*G06F 17/30* (2006.01)

(52) U.S. Cl.
CPC .................................. *G06F 17/3074* (2013.01)
USPC .......................................... 704/254; 707/772

(58) Field of Classification Search
CPC ....................................................... G10L 25/81
See application file for complete search history.

(56) References Cited

U.S. PATENT DOCUMENTS

| 6,542,869 | B1 * | 4/2003 | Foote | 704/500 |
|---|---|---|---|---|
| 6,633,845 | B1 * | 10/2003 | Logan et al. | 704/255 |
| 7,091,409 | B2 * | 8/2006 | Li et al. | 84/634 |
| 7,250,567 | B2 * | 7/2007 | Gayama | 84/613 |
| 7,328,153 | B2 * | 2/2008 | Wells et al. | 704/231 |
| 7,337,115 | B2 * | 2/2008 | Liu et al. | 704/246 |
| 7,720,852 | B2 * | 5/2010 | Dunning | 707/750 |
| 7,812,241 | B2 * | 10/2010 | Ellis | 84/612 |
| 8,190,435 | B2 * | 5/2012 | Li-Chun Wang et al. | 704/270 |
| 8,190,663 | B2 * | 5/2012 | Schnitzer | 700/94 |
| 8,200,490 | B2 * | 6/2012 | Choi et al. | 704/252 |
| 8,275,177 | B2 * | 9/2012 | Fiebrink et al. | 382/124 |
| 8,554,553 | B2 * | 10/2013 | Mysore et al. | 704/226 |
| 2001/0044719 | A1 * | 11/2001 | Casey | 704/245 |
| 2011/0054910 | A1 * | 3/2011 | Fujihara et al. | 704/278 |
| 2012/0096018 | A1 * | 4/2012 | Metcalf | 707/758 |

OTHER PUBLICATIONS

Bathe, Eloi, Jaume Masip, and Enric Guaus. "Automatic song identification in noisy broadcast audio." IASTED International Conference on Signal and Image Processing. 2002.*
Miotto, Riccardo, and Nicola Orio. "A Music Identification System Based on Chroma Indexing and Statistical Modeling." ISMIR. 2008.*
Yaguchi, Yuuichi, and Ryuichi Oka. "Song wave retrieval based on frame-wise phoneme recognition." Information Retrieval Technology. Springer Berlin Heidelberg, 2005. 503-509.*
Mesaros, Annamaria, and Tuomas Virtanen. "Recognition of phonemes and words in singing." Acoustics Speech and Signal Processing (ICASSP), 2010 IEEE International Conference on. IEEE, 2010.*

(Continued)

*Primary Examiner* — Brian Albertalli
(74) *Attorney, Agent, or Firm* — Amin, Turocy & Watson, LLP

(57) ABSTRACT

Systems and methods for identifying music in a noisy environment are described. One of the methods includes receiving audio segment data. The audio segment data is generated from the portion that is captured in the noisy environment. The method further includes generating feature vectors from the audio segment data, identifying phonemes from the feature vectors, and comparing the identified phonemes with pre-assigned phoneme sequences. Each pre-assigned phoneme sequence identifies a known music piece. The method further includes determining an identity of the music based on the comparison.

17 Claims, 9 Drawing Sheets

(56) References Cited

OTHER PUBLICATIONS

Kim, Kwang-Ho, Minkyu Lim, and Ji-Hwan Kim. "Music copyright protection system using fuzzy similarity measure for music phoneme segmentation." Fuzzy Systems, 2009. FUZZ-IEEE 2009. IEEE International Conference on. IEEE, 2009.*

E. Weinstein, et al., "Music Identification with Weighted Finite-State Transducers", Proc. of ICASSP, Honolulu, HI, USA, Apr. 2007.

A. Gionis et al., "Similarity Search in High Dimensions via Hashing", in Proceedings of the $25^{th}$ International Conference on Very Large Data Bases, San Francisco, CA, USA, 1999, VLDB '99, pp. 518-529, Morgan Kaufmann Publishers Inc.

S. Baluja et al., "Audio Fingerprinting: Combining Computer Vision & Data Stream Processing", in Proc. of ICASSP, Honolulu, HI, USA, Apr. 2007.

A. Wang, "An industrial-Strength Audio Search Algorithm", in Proc. ISMIR, Baltimore, MD, USA, Oct. 2003.

M. Mohri et al., "Efficient and Robust Music Identification with Weighted Finite-State Transducers", in IEEE Trans. on Audio, Speech and Language Processing, 2010, vol. 18(1).

M. Mohri et al., "Robust Music Identification, Detection, and Analysis", in Proc. of ISMIR, Vienna, Austria, Sep. 2007.

B. Logan, "Mel Frequency Cepstral Coefficients for Music Modeling", in proc. of ISMIR,, Plymouth, MA, USA, Oct. 2000.

J. Schalkwyk et al., "Google Search by Voice: A Case Study", in Advances in Speech Recognition: Mobile Environments, Call Centers and Clinics, Chapter 4, pp. 61-90, Springer, 2010.

H. Hermansky, "Perceptual Linear Predictive (PLP) Analysis of Speech", in Journal of the Acoustical Society of America, vol. 87(4), pp. 1738-1752, 1990.

J. Foote, "Automatic Audio Segmentation Using a Measure of Audio Novelty", in Proc. IEEE Int. Conf. on Multimedia and Expo, New York, NY, USA, Aug. 2000, pp. 452-455.

W. Chai, "Automated Analysis of Music Structure", Ph.D. Thesis, MIT, 2005.

M. A. Bartsch, "To Catch a Chorus: Using Chroma-Based Representations for Audio Thumbnailing", in Proc. IEEE Workshop on Applications of Signal Processing to Audio and Acoustics, New Paltz, NY, USA, Oct. 2001.

R. B. Dannenberg, "Discovering Musical Structure in Audio Recordings", in Music and Artificial Intelligence: Second International Conference; LNCS vol. 2445, Berlin, 2002, pp. 43-57, Springer.

J.R. Hershey et al., "Approximating the Kullback Leibler Divergence Between Gaussian Mixture Models", in Proc. of ICASSP, Honolulu, HI, USA, Apr. 2007.

* cited by examiner

SYSTEMS AND METHODS FOR IDENTIFYING MUSIC IN A NOISY ENVIRONMENT

FIELD

The present disclosure relates to systems and methods for identifying music in a noisy environment.

BACKGROUND

With the wide spread of the Internet, a variety of client devices have gained popularity. Some client devices include smart phones. Users carry client devices to a majority of places they visit to be able to capture moments in the user's life. For example, a user visits a scenic place and takes pictures of the place with a cell phone camera. As another example, a user exercises while listening to music on his/her smart phone.

The client devices also provide information to the users. For example, a user accesses the Internet via a smart phone to perform a search regarding an identity of a place that he/she is visiting. However, the client devices have limitations in providing identification of some information that may be of interest to the user.

It is in this context that embodiments arise.

SUMMARY

Various embodiments of the present invention provide systems and methods for identifying music in a noisy environment. It should be appreciated that the embodiments of the present invention can be implemented in numerous ways, such as a process, an apparatus, a system, a device or a method on a computer-readable medium. Several embodiments of the present invention are described below.

In one aspect, a service that allows a user to determine an identity of music that is played in a noisy environment is provided. The user can record the music with his/her client device in a noisy environment and receives an identification of the music on his/her client device.

In another aspect, an acoustic model is generated based on recordings that are generated by recording music at a variety of locations. The recording of the same music at a variety of locations allows creation of the acoustic model that is used to recognize audio data that is generated in a noisy environment.

In yet another aspect, the acoustic model is a statistical module that assigns phoneme labels to feature data that is computed from segments of music audio. For example, the acoustic model identifies phoneme labels based on the feature data. Moreover, in this aspect, the phoneme labels are used to recognize music that is generated in a noisy environment. In one embodiment, the terms "phoneme labels" and "phonemes" are used interchangeably herein.

In another aspect, a method for identifying music in a noisy environment is described. The method includes receiving audio segment data. The audio segment data is generated from the portion that is captured in the noisy environment. The method further includes generating feature vectors from the audio segment data, identifying phonemes from the feature vectors, and comparing the identified phonemes with pre-assigned phoneme sequences. Each pre-assigned phoneme sequence identifies a reference music recording, which is a known music piece. The method further includes determining an identity of the music based on the comparison.

In another embodiment, a method for generating a database is described. The method includes receiving a first set of audio data that is generated from a playback of music, accessing a second set of audio data from a memory device, generating a first sequence of feature vectors from the first set of audio data, and generating a first set of phonemes from the first sequence of feature vectors. The method further includes generating a second sequence of feature vectors from the second set of audio data, generating a second set of phonemes from the second sequence of feature vectors, and aligning one or more of the phonemes of the second set with one or more of the phonemes of the first set based on the associations of the first and second sequences of feature vectors with a parameter of the music. The method includes generating the database including the second set of aligned phonemes.

In yet another aspect, a system for identifying music from a portion of the music that is captured in a noisy environment is described. The system includes a network adapter for receiving audio segment data. The audio segment data is generated from the portion that is captured in the noisy environment. The system further includes a processor for generating feature vectors from the audio segment data. The processor is used for identifying phonemes from the feature vectors and for comparing the identified phonemes with pre-assigned phoneme sequences. Each pre-assigned phoneme sequence identifies a known music piece. The processor is further used for determining an identity of the music based on the comparison.

Other aspects will become apparent from the following detailed description, taken in conjunction with the accompanying drawings.

BRIEF DESCRIPTION OF THE DRAWINGS

Various embodiments of the present invention may best be understood by reference to the following description taken in conjunction with the accompanying drawings.

DETAILED DESCRIPTION

The following embodiments describe systems and methods for facilitating rendering visualizations related to audio data.

It will be apparent, that the present embodiments may be practiced without some or all of these specific details. In other instances, well known process operations have not been described in detail in order not to unnecessarily obscure the present embodiments.

Figure 1:
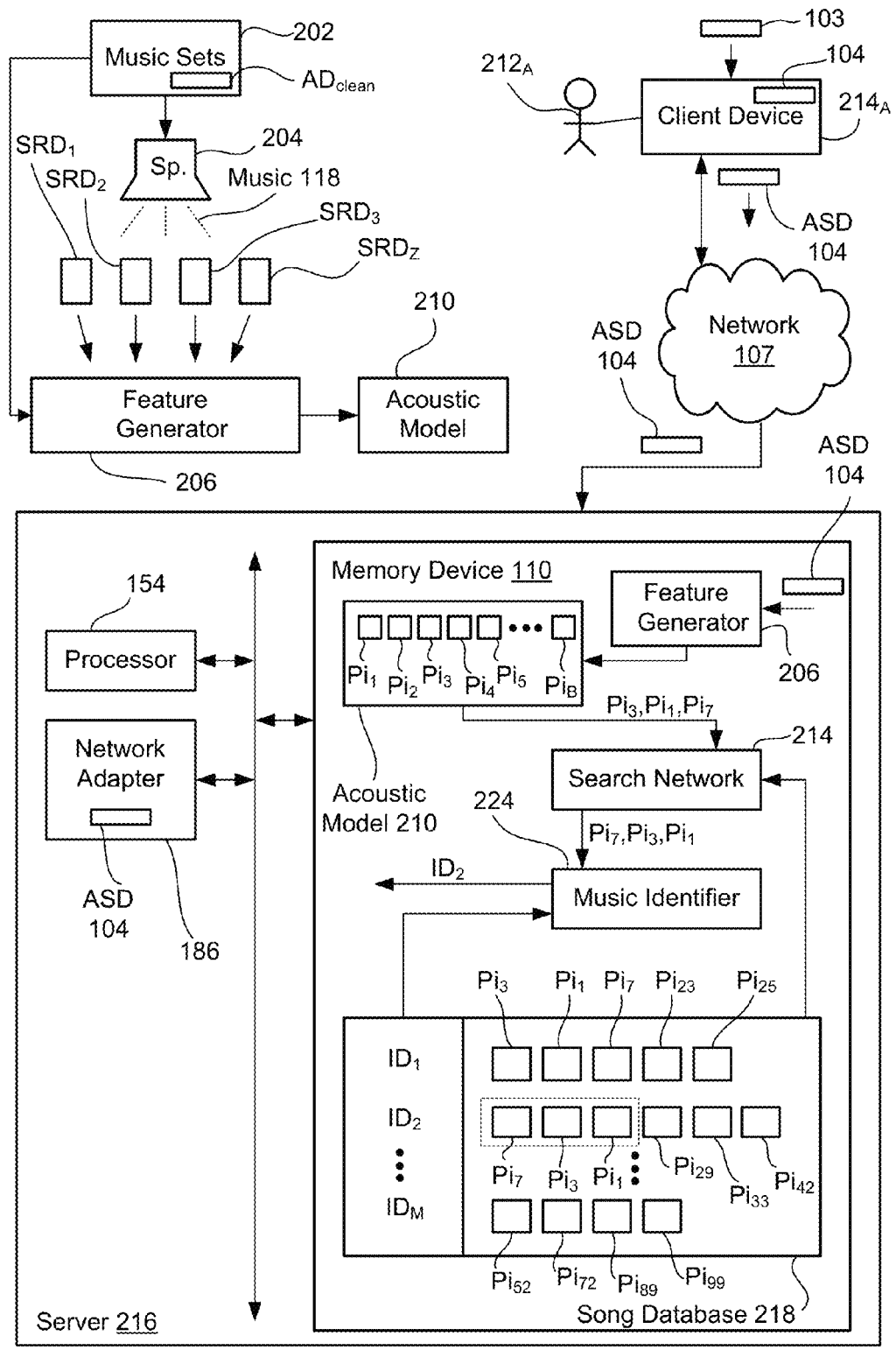
FIG. 1 is a block diagram of a system for identifying music that is recorded in a noisy environment, in accordance with one embodiment of the present invention.

FIG. 1 is a block diagram of an embodiment of a system for identifying music that is recorded in a noisy environment. Multiple music sets 202 include clean audio data $AD_{clean}$. As used herein, music includes a sound or a combination of sound and silence. For example, music includes a song. In some embodiments, music includes pitch, rhythm, lyrics, chorus, treble, dynamics, or a combination thereof. In some embodiments, the clean audio data $AD_{clean}$ is stored in a memory device, such as a compact disc, a flash memory, or a memory device of a server. The audio data $AD_{clean}$ is played back via a speaker set 204, which includes one or more speakers, to generate music 118. A playback device is described below.

Multiple sound recording devices $SRD_1$, $SRD_2$, $SRD_3$ thru $SRD_z$ record the music 118, where z is an integer greater than zero. It should be noted that a sound recording device includes a digital audio recorder and a network adapter, such as a modem or a network interface card. In some embodiments, a sound recording device is integrated within a client device, such as, a cell phone, a desktop computer, a laptop computer, and a tablet. The sound recording devices $SRD_1$ thru $SRD_z$ record the music 118 to generate audio data $AD_{SRD1}$ thru $AD_{SRDz}$. For example, the sound recording device $SRD_1$ records the music 118 to generate audio data $AD_{SRD1}$. As another example, the sound recording device $SRD_z$ records the music 118 to generate audio data $AD_{SRDz}$.

In some embodiments, noise characteristics of the clean audio data $AD_{clean}$ are different than noise characteristics of the audio data, such as $AD_{SRD1}$ thru $AD_{SRDz}$. For example, the clean audio data $AD_{clean}$ is recorded using a recorder that has a different characteristic than that of the sound recording device $SRD_z$. As another example, the clean audio data $AD_{clean}$ is recorded in a different environment than an environment in which the audio data $SRD_z$ is recorded. As yet another example, the clean audio data $AD_{clean}$ is recorded using different channel characteristics than that used to record the audio data $SRD_z$. As another example, the clean audio data $AD_{clean}$ excludes environmental noise and/or white Gaussian noise.

A feature generator 206 computes a sequence of feature vectors from audio data. For example, the feature generator 206 computes a sequence of features from the audio data $AD_{SRD1}$. As another example, the feature generator 206 computes a $z^{th}$ sequence of feature vectors from the audio data $AD_{SRDz}$. Moreover, the feature generator 206 computes a sequence of feature vectors from the clean audio data $AD_{clean}$. A manner of computation of feature vectors from audio data is described below.

An acoustic model 210 generates a set of phonemes, such as a set including phonemes $Pi_1$, $Pi_2$, $Pi_3$, $Pi_4$, $Pi_5$ thru $Pi_B$ from the z sequences of feature vectors and the feature vectors that are generated from the clean audio data $AD_{clean}$, where B is an integer greater than zero. A description of generation of a set of phonemes from the z sequences of feature vectors and the feature vectors that are computed from the clean audio data $AD_{clean}$ is described below. In some embodiments, the acoustic model 210 generates a set of phonemes from the z sequences of feature vectors without using the clean audio data $AD_{clean}$. The acoustic model 210 is stored in a memory device 110 of a server 216. Examples of a memory device include a read-only memory (ROM), a random access memory (RAM), or a combination thereof. For example, a memory device includes a hard disk, a flash memory, a disk array, or a combination thereof.

A user $212_A$ is using his/her client device $214_A$ in a noisy environment to capture a portion 103 of music. For example, the user $212_A$ is using his/her client device $214_A$ in a noisy environment in which noise is generated by the user $212_A$, other users, and/or environmental objects other than the device 214A. Examples of the environmental objects include speakers, musical instruments, vehicles, and client devices. Examples of the other users include a singer and a musical instrument player. For example, the user $212_A$ is recording with the client device $214_A$, a live source, such as a singer or a musical instrument player, of music in a concert. The concert is an example of a noisy environment.

In some embodiments, a noisy environment includes any source, such as, for example, channels that are used to generate and/or record music. Characteristics of the channels add noise to music. Some examples of characteristics of channels include characteristics of a sound recording device that is used to record music, characteristics of a microphone that is used to convert sound energy into electrical energy, characteristics of a speaker that outputs music, characteristics of an amplifier that is used to amplify the electrical energy, reverberation effects of a room in which music is generated, etc. Examples of the channels include a sound recording device, a room in which the sound recording device is placed, speakers that are used to emit music in the form of sound energy, a microphone that is used by a singer or musician to convert sound energy into electrical energy, an amplifier that is used to amplify the electrical energy, etc.

In various embodiments, a noisy environment is an environment in which noise is produced by a user or an environmental object other than a client object that is playing back music, which is recorded by the client device $214_A$. As an example, the user $212_A$ is recording with the client device $214_A$ music that is played back using another client device. In this example, there is noise generated by traffic, conversations between users, ongoing construction work, or other noise sources. The music played back using the other client device is generated in a noisy environment.

The client device $214_A$ generates audio segment data (ASD) 104 from the portion 103 of music and sends the audio segment data 104 via a network 107 to a server 216. Examples of the network 107 include a wired network and a combination of a wired network and a wireless network. Other examples of the network 107 include the Internet, an Intranet, and a combination thereof. Yet other examples of the network 107 include a local area network (LAN), a wide area network (WAN), and a combination thereof. Examples of the server 216 include a virtual machine (VM) and a physical machine.

A network adapter 186 of the server 216 receives the audio segment data 104 and stores the audio segment data 104 in the memory device 110. The feature generator 206 of the server 216 computes feature vectors from the audio segment data 104.

A search network 214 receives the feature vectors that are computed from the audio segment data 104 to assign phonemes, such as phonemes $Pi_3$, $Pi_1$, and $Pi_7$, to the feature vectors. The phonemes are assigned based on the acoustic model 210 of the server 216. For example, the search network 214 determines whether phonemes generated from the feature vectors that are generated from the audio segment data 104 match any of the phonemes $Pi_1$ thru $Pi_B$. The operation of matching results in an identification one or more of the phonemes $Pi_1$ thru $Pi_B$ from the feature vectors. Upon determining that the phonemes generated from the feature vectors that are generated from the audio segment data 104 match the phonemes $Pi_1$, $Pi_3$ and $Pi_7$ of the acoustic model 210, the search network 214 assigns the phonemes $Pi_1$, $Pi_3$ and $Pi_7$ to the feature vectors It should be noted that in some embodiments, any number of feature vectors are generated from the audio segment data 104 and any number of phonemes are assigned to the feature vectors.

The search network 214 also receives the identified phonemes (e.g., the assigned phonemes) and performs a search within a database 218 to determine a probability of match between the identified phonemes and phonemes stored within the database 218. For example, the search network 214 receives the identified phonemes $Pi_3$, $Pi_1$ and $Pi_7$ and performs a search within the database 218 to determine whether any combination of phonemes of the stored phonemes within database 218 matches the identified phonemes. In this example, the search network 214 determines that there is a lesser probability of match of the identified phonemes $Pi_3$, $Pi_1$ and $Pi_7$ with the combination $Pi_3$ and $Pi_1$ of stored phonemes that represents music with an identification $ID_1$ than with the combination $Pi_7$, $Pi_3$, and $Pi_1$ of stored phonemes that represents music with an identification $ID_2$. Also, in this example, the search network 214 determines that there is no probability of match between the identified phonemes $Pi_3$, $Pi_1$ and $Pi_7$ with a combination of the stored phonemes $Pi_{52}$, $Pi_{72}$, $Pi_{89}$, and $Pi_{99}$ that represents music that is identified with an identification $ID_M$, where M is an integer greater than zero.

Upon determining that the identified phonemes have a highest probability of match with a combination of stored phonemes within database 218 among other probabilities of match of the identified phonemes with other combinations of stored phonemes within database 218, the search network 214 provides the combination of stored phonemes with the highest probability of match to a music identifier 224.

It should be noted that in some embodiments, the assignment of phonemes to the feature vectors that are computed from the audio segment data 104 is performed concurrently with the performance of the search within the database 218 to determine a probability of match between the identified phonemes and phonemes stored within the database 218. The concurrent performances are sometimes referred to herein as Viterbi decoding. In other embodiments, the assignment of phonemes to the feature vectors that are computed from the audio segment data 104 precedes the performance of the search within the database 218 to determine a probability of match between the identified phonemes and phonemes stored within the database 218.

The music identifier 224 determines an identification of music from the combination of stored phonemes with the highest probability of match to provide an identification to a client device, such as client device $214_A$, via the network 107. For example, the music identifier 224 determines that the combination $Pi_7$, $Pi_3$, and $Pi_1$ of stored phonemes within database 218 is within a set of phonemes that represents music that is identified with an identification $ID_2$ and provides the identification $ID_2$ to the client device $214_A$ via the network 107.

The user $212_A$ views, on a display device of the client device $214_A$, a representation of the identification that is received via the network 107 and recognizes music that includes the portion 103. As used herein, a representation of an identification of music includes a name of an artist that created the music, an image of the artist, a title of the music, a title of an album of the music, a publisher, a name of a song writer that wrote lyrics of the music, an image of the song writer, a name of a composer that composed the music, an image of the composer, a name of a publisher that published the music, or a combination thereof. Examples of a display device include a liquid crystal display (LCD) display device, a light emitting diode (LED) display device, a cathode ray tube (CRT) display device, and a plasma display device.

Examples of the stored phonemes within the database 218 include a one or more of the phonemes $Pi_1$ thru $Pi_B$. For example, a set of phonemes $Pi_3$, $Pi_1$, $Pi_4$, $Pi_{23}$, and $Pi_{25}$ represent music that is identified with the identification $ID_1$ and an $M^{th}$ set of phonemes $Pi_{52}$, $Pi_{72}$, $Pi_{89}$, and $Pi_{99}$ represents music that is identified with the identification $ID_M$. As an example, an identification of music includes a bit stream that identifies music to distinguish the music from other music. For example, a first bit stream of $ID_1$ identifies music that is represented by phonemes $Pi_3$, $Pi_1$, $Pi_{17}$, $Pi_{23}$, and $Pi_{25}$ and a second bit stream of $ID_2$ identifies music that is represented by phonemes $Pi_7$, $Pi_3$, $Pi_1$, $Pi_{29}$, $Pi_{33}$, and $Pi_{42}$.

In some embodiments, the stored phonemes within database 218 are created using the acoustic model 210. For example, the feature generator 206 computes feature vectors from audio data for all music that is stored in the database 218 and the acoustic model 210 generates phonemes from the feature vectors. As another example, the acoustic model 210 determines that phonemes $Pi_3$, $Pi_1$, $Pi_4$, $Pi_{23}$, and $Pi_{25}$ can be generated from the feature vectors that are computed from audio data of music that is identified with the identification $ID_1$. In this example, upon determining that the phonemes $Pi_3$, $Pi_1$, $Pi_4$, $Pi_{23}$, and $Pi_{25}$ can be generated from the feature vectors, the acoustic model 210 determines that the music that is identified with the identification $ID_1$ is represented by phonemes $Pi_3$, $Pi_1$, $Pi_4$, $Pi_{23}$, and $Pi_{25}$.

In some embodiments, music that is stored in database 218 includes more music than that used to generate the acoustic mode 216. For example, the database 218 includes a larger number of songs than a number of songs within the music sets 202.

In other embodiments, the phonemes that are generated by the acoustic model 210 and the feature vectors that are computed from audio data for all music within database 218 are used to identify phonemes of music within the database 218. For example, the processor 154 applies a Hidden Markov Model (HMM) approach to determine, based on the acoustic model 210, phonemes of all music whose identifications are stored within the database 218. In this example, the acoustic model 210 assigns a few phonemes, from the phonemes $P_{i1}$ thru $P_{iB}$, to each piece of music audio, such as each song, that is identified in the database 218. The few phonemes for each piece of music audio that is identified with the identification $ID_M$ are used to determine the remaining phonemes of the piece of music audio. The processor 154 assigns a probability of a next or preceding unknown phoneme being one of the phonemes $Pi_1$ thru $Pi_B$ of the acoustic model 210 based on knowledge of a current phoneme of the piece of music audio that is identified with the identification $ID_M$. Once the current phoneme is known, the next or preceding phoneme is determined based on the assigned probability. The next phoneme is consecutive to the current phoneme and the preceding phoneme precedes the current phoneme. Also, the processor 154 assigns a probability that the few phonemes and one or more of the remaining phonemes identify the piece of music audio with the identification $ID_M$. Based on the probability, the processor 154 determines the identification $ID_M$ of the piece of music audio. It should be noted that in some embodiments, the terms "music" and "piece of music audio" are used interchangeably.

It is noted that although the feature generator 206, the acoustic model 210, the search network 214, and the music identifier 224 are shown as included within the server 216, in other embodiments, the feature generator 206, the acoustic model 210, the search network 214, and the music identifier 224 are divided among different servers. For example, the feature generator 206 and the acoustic model 210 are located within the server 216 and the search network 214 and the music identifier 224 are located within another server that is coupled to the server 216 via the network 107. As another example, the feature generator 206 and the acoustic model 210 are located within the server 216, the search network 214 is located within another server that is coupled to the server 216 via the network 107, and the music identifier 224 is located within yet another server that is coupled to the server 216 via the network 107.

It is further noted that the feature generator 206, the acoustic model 210, the search network 214, and the music identifier 224 are software modules, which are computer programs that are executable by one or more processors of one or more servers. In other embodiments, one or more of the feature generator 206, the acoustic model 210, the search network 214, and the music identifier 224 is implemented within hardware, such as one or more application specific integrated circuits (ASICs) and one or more field programmable gate arrays (FPGAs). Examples of a processor include an ASIC, an FPGA, a microprocessor, and a central processing unit (CPU).

Figure 2:
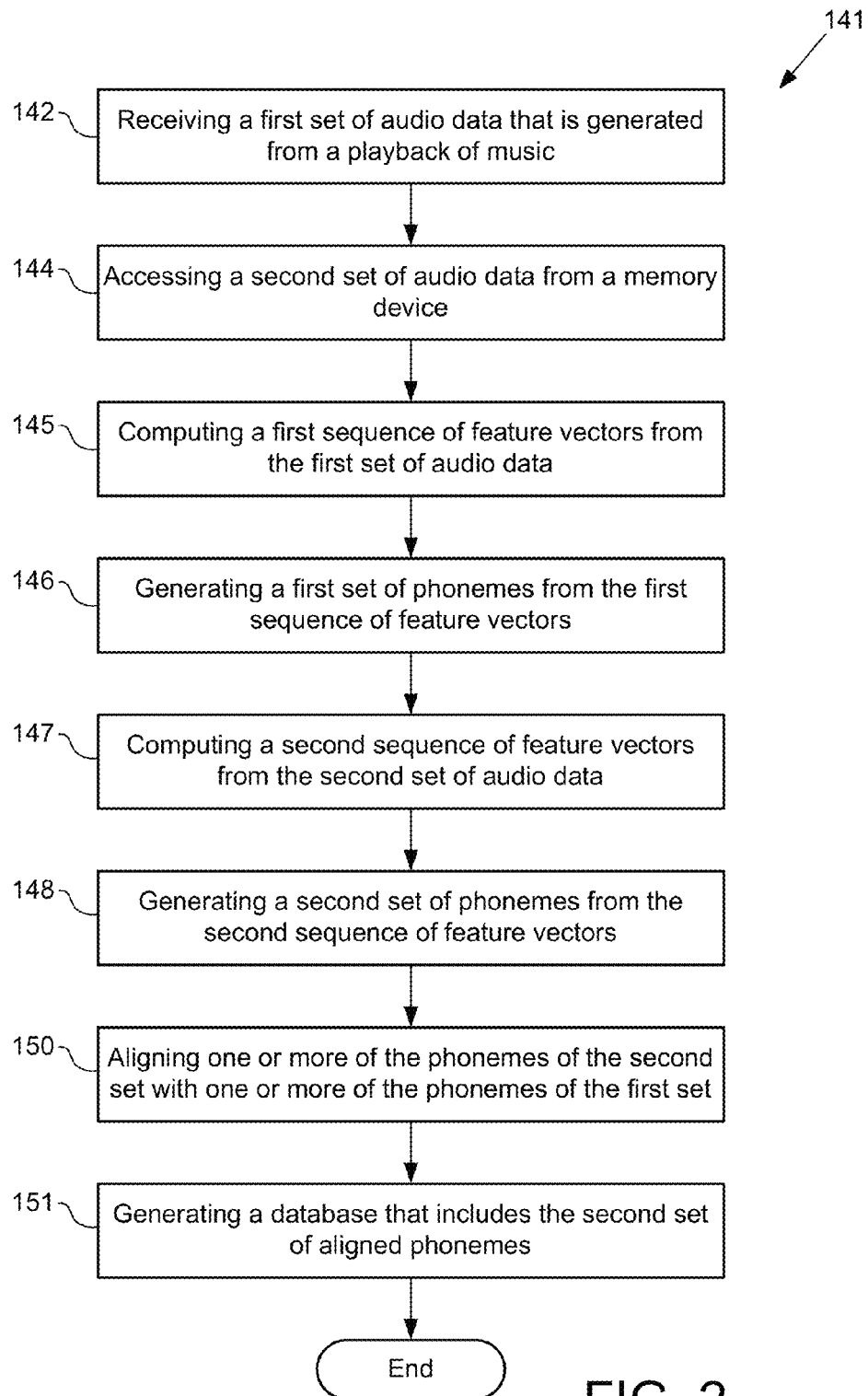
FIG. 2 is a flowchart of an embodiment of a method for generating an acoustic model, in accordance with one embodiment of the present invention.

FIG. 2 is a flowchart of an embodiment of a method 141 for generating the acoustic model 210. The method 141 is performed by one or more processors of one or more servers, such as server 216 (FIG. 1). In operation 142, a first set of audio data, such as $AD_{SRDz}$, is received. For example, the first set of audio data is received via the network 107 (FIG. 1). The first set of audio data is generated from a playback of music 118 (FIG. 1). For example, when the music 118 is played back via a playback device, which is described below, the sound recording device $SRD_z$ (FIG. 1) records the music 118 in the form of audio data. In this example, each sound recording device $SRD_z$ includes an acoustic energy to electrical energy converter that converts sound energy of the music 118 to electrical energy of electrical signals. Moreover, each sound recording device $SRD_z$ includes a sampler that samples the electrical signals to convert the electrical signals from an analog format into a digital format to generate audio data. In some embodiments, the sound recording device $SRD_z$ includes a filter that filters the electrical signals in the analog form or the digital form to generate audio data. In various embodiments, multiples sets of audio data are generated from multiple sound recording devices SRD to generate multiple sets, such as $AD_{SRD1}$, $AD_{SRD2}$ and so on until $AD_{SRDz}$, of audio data.

In operation 144, a second set of audio data is accessed from a memory device that stores the music sets 202. The second set of audio data includes the clean audio data $AD_{clean}$ (FIG. 1). The second set of audio data is played back to generate the music 118.

Furthermore, in operation 144, a first sequence of feature vectors, such as "abcdefghijldmnop", is generated from the first set of audio data. For example, a frequency computation engine is used to convert the first set of audio data from a time domain to a frequency domain to generate frequencies. In some embodiments, the frequency computation engine limits the frequencies generated to range between 125 hertz (Hz) and 3800 Hz. For example, a filter is used within the frequency computation engine to limit the frequencies to range between 125 Hz and 3800 Hz. Moreover, in this example, a logarithmic frequency computation engine is used to generate logarithmic frequencies from the frequencies. In some embodiments, the terms "logs" and "logarithms" are used interchangeably. To illustrate, the frequencies are divided by a constant $c_1$ to generate results. In this illustration, a logarithm to a base 2 is calculated from the results to generate outcomes, which are multiplied with another constant $c_2$ to generate the logarithmic frequencies. An example equation is provided below to explain the illustration:

$$F_{notes} = c_2 \log_2(F/c_1) \quad (1)$$

where $F_{notes}$ are examples of the logarithmic frequencies and F are examples of the frequencies generated when the first set of audio data is converted from the time domain to the frequency domain. In some embodiments, $c_1$ has a value of 440 and $c_2$ has a value of 12. In other embodiments, $c_1$ has a value ranging between 438 and 442 and $c_2$ has a value ranging between 11 and 13.

As another illustration, the frequencies that are generated by converting the first set of audio data from the time domain to the frequency domain are added to a constant $c_3$ to generate quantities. Moreover, in this illustration, a logarithm to the base 2 is calculated from the quantities to generate the logarithmic frequencies. An example equation is provided below to explain the illustration:

$$F_{log\,2} = \log_2(c_3 + F) \quad (2)$$

where $F_{log\,2}$ are examples of the logarithmic frequencies. In some embodiments, $c_3$ has a value of 1. In other embodiments, c3 has a value ranging between 0.9 and 1.1. In other embodiments, instead of log to the base 2, log to another base, such as an exponential base or base 10 is used.

To continue with the example in which the logarithmic frequencies are generated, the logarithmic frequencies are measured with respect to time to generate a spectral matrix. To illustrate, frequency bins of logarithmic frequencies are generated with respect to time frames. An example of the spectral matrix is provided below. Examples of a time frame include a second, a minute, a fraction of a minute, or a fraction of a second. Values of the logarithmic frequencies at a time frame is a feature vector, such as the feature vector "a", "b", "c", "d", "e", "f", "g", "h", "i", "j", "k", "l", "m", "n", "o", or "p". In the embodiments in which the multiple sets of audio data are generated from the multiple sound recording devices $SRD_1$ thru $SRD_z$, multiple sequences of feature vectors are generated in a similar manner as that described above.

In operation 146, a first set of phonemes is generated from the first sequence of feature vectors. For example, the first set of phonemes includes a phoneme "abc", another phoneme "de", a phoneme "fg", another phoneme "hijkl", and another phoneme "mnop". As another example, the feature vectors of the first sequence are partitioned into different phonemes based on one or more values of parameters of the music 118. Examples of a parameter of music include a chorus, a musical instrument, a lyric, a pitch, a treble, a rhythm, and a dynamic of the music. To illustrate, the feature vectors of the first sequence are partitioned into two different phonemes. In this illustration, a first phoneme represents a high pitch of music and a second phoneme represents a low pitch that is lower than the high pitch of the music. As another illustration, the feature vectors of the first sequence are partitioned into multiple different phonemes based on a chorus and a musical instrument that is played in the music 118. As yet another example, the feature vectors of the first sequence are partitioned into multiple different phonemes based on a combination of one or more parameters of the music 118. As another example, the feature vectors of the first sequence are partitioned into multiple different phonemes, where a first one of the phonemes represents a lyric "try harder" and another one of the phonemes represents a different lyric "I love you are you are". In some embodiments, each phoneme extends over one or more time frames.

In the embodiments in which multiple sets of audio data are generated from multiple recordings of the music 118, multiple sets of phonemes are generated from the multiple sequences of feature vectors in a manner similar to that of generating the phonemes of the first set from the feature vectors of the first sequence.

In operation 147, a second sequence of feature vectors, such as "cdefjklmn", is generated from the second set of audio data in a manner similar to generating the first sequence of feature vectors from the first set of audio data. Moreover, in operation 148, a second set of phonemes is generated from the second sequence of feature vectors in a manner similar to that of generating the phonemes of the first sequence from the feature vectors of the first set. As an example, the second set of phonemes includes a phoneme "c", another phoneme "de", a phoneme "f", another phoneme "jkl", and another phoneme "mn".

It should be noted that in some embodiments, operations of computing feature vectors, such as the operations 145 and 147, are performed by the feature generator 206 (FIG. 1) and operations of generating phonemes from feature vectors, such as the operations 146 and 148, are performed by the acoustic model 210 (FIG. 1).

In operation 150, one or more of the phonemes of the second set are aligned with one or more of the phonemes of the first set based on values of one or more parameters of the music 118. For example, if a phoneme of the second set identifies a lyric of music 118 and a phoneme of the first set is generated at the same time the lyric is being played back and the phoneme of the first set is different than the phoneme of the second set, the phoneme of the first set is aligned to identify the lyric instead of some other lyric. In this example, the phoneme of the first set is different than the phoneme of the second set because of a noise in an environment in which the music 118 is generated and/or because of white Gaussian noise, which is described below. As another example, if a phoneme of the second set identifies a pitch of music 118 and a phoneme of the first set is generated at the same time the pitch is being played back and the phoneme of the first set is different than the phoneme of the second set, the phoneme of the first set is aligned to identify the pitch instead of some other pitch. In operation 151, a database that includes the first set of phonemes that are aligned with phonemes of the second set is generated as a part of the acoustic model 210.

In some embodiments, a value of a parameter of music 118 is determined based on a combination of amplitudes and frequencies generated from the clean audio data $AD_{clean}$. For example, a combination of amplitudes and/or frequencies defines a value of pitch and another combination of amplitudes and/or frequencies defines another value of pitch. As another example, a combination of amplitudes and/or frequencies defines a lyric and another combination of frequencies and/or amplitudes defines a different lyric.

In the embodiments in which multiple sets of phonemes are generated from multiple sequences of feature vectors, one or more phonemes of the multiple sets are aligned with one or more phonemes of the second set in a manner similar to that of aligning the one or more phonemes of the first set with the one or more phonemes of the second set. In these embodiments, the database that is generated in operation 151 includes the aligned phonemes of the multiple sets.

In some embodiments, the method 141 is performed without performing the operations 144, 147, 148, and 150. For example, in these embodiments, the clean audio data $AD_{clean}$ is not used to generate the second set of phonemes. Rather, in these embodiments, the first set of audio data is received in operation 142, the first sequence of feature vectors are computed in operation 145, the first set of phonemes are generated in operation 146, and a database that includes the first set of phonemes is generated.

In other embodiments, one or more phonemes of each of the multiple sets of phonemes are not aligned with one or more phonemes of the second set. Rather, in these embodiments, the clean audio data $AD_{clean}$ is not used to generate the second set of phonemes. In these embodiments, a database that includes the multiple sets of phonemes is generated.

Figure 3:
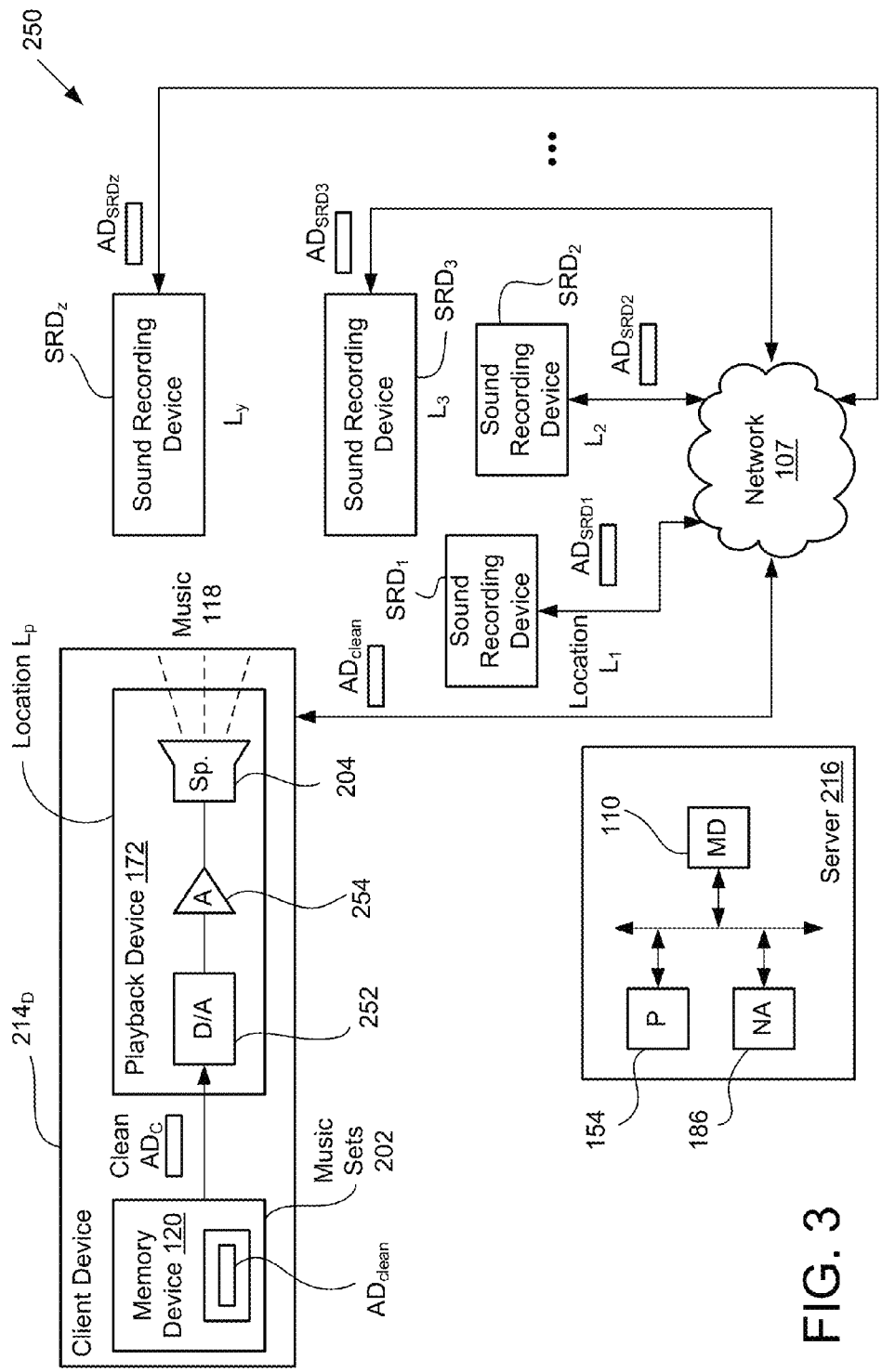
FIG. 3 is a block diagram of an embodiment of a system for generating audio data that is used to generate the acoustic model, in accordance with an embodiment of the invention.

FIG. 3 is a block diagram of an embodiment of a system 250 for generating audio data that is used to generate the acoustic model 210 (FIG. 1). A client device $214_D$ is used to play back music 118. A memory device 120 of the client device $214_D$ includes the clean audio data $AD_{clean}$. A playback device 172 of the client device $214_D$ accesses the clean audio data $AD_{clean}$ to play back the music 118. For example, a digital-to-analog (D/A) converter 252 accesses the clean audio data $AD_{clean}$ from the memory device 120 and converts the clean audio data from a digital form to an analog form. An amplifier 254 of the playback device 172 amplifies the analog formatted clean audio data to generate amplified data. The speaker set 204 converts electrical energy within the amplified data into sound energy to provide music 118.

The sound recording devices $SRD_1$ thru $SRD_z$ record the music 118 in the form of audio data. For example, the sound recording device $SRD_1$ records the music 118 in the form of audio data $AD_{SRD1}$, the sound recording device SRD2 records the music 118 in the form of audio data $AD_{SRD2}$ and so on until the sound recording device $SRD_z$ records the music 118 in the form of audio data $AD_{SRDz}$.

The sound recording device $SRD_1$ is at a location $L_1$ with respect to the playback device 172, the sound recording device $SRD_2$ is at a different location $L_2$ with respect to the playback device 172 and so on until the sound recording device $SRD_z$ is at a location $L_z$ with respect to the playback device 172. In other embodiments, two or more of the sound recording devices SRD are located at the same location with respect to the playback device 172 and the remaining sound recording devices are located at a different location with respect to the playback device 172. For example, the sound recording devices $SRD_1$ and $SRD_2$ are located at the location $L_1$ and the remaining sound recording devices $SRD_3$ thru $SRD_z$ are located at the location $L_z$.

The audio data $AD_{SRD1}$ thru $AD_{SRDz}$ is sent by the respective sound recording devices $SRD_1$ thru $SRD_z$ via the network 107 to the server 216 for storage in the server 216. For example, a network adapter (not shown in FIG. 3) of each sound recording device $SRD_1$ thru $SRD_z$ sends the respective audio data $AD_{SRD1}$ thru $AD_{SRDz}$ via the network 107. Moreover, in the embodiments in which the clean audio data $AD_{clean}$ is used, the clean audio data $AD_{clean}$ is sent from the client device $214_D$ via the network 107 to the server 216. For example, a network adapter (not shown in FIG. 3) of the client device $214_D$ sends the clean audio data $AD_{clean}$ via the network 107 to the server 216. In the embodiments in which the clean audio data $AD_{clean}$ is not used, the clean audio data $AD_{clean}$ is not sent from the client device $214_D$ via the network 107 to the server 216.

The network adapter 186 receives the audio data $AD_{SRD1}$ thru $AD_{SRDz}$ and the clean audio data $AD_{clean}$ and stores the audio data $AR_{SRD1}$ thru $AD_{SRDz}$ and the clean audio data $AD_{clean}$ in the memory device 110. The processor 154 performs the operations 144, 145, 146, 147, 148, 150, and 152 to execute the method 141 (FIG. 2).

Figure 4:
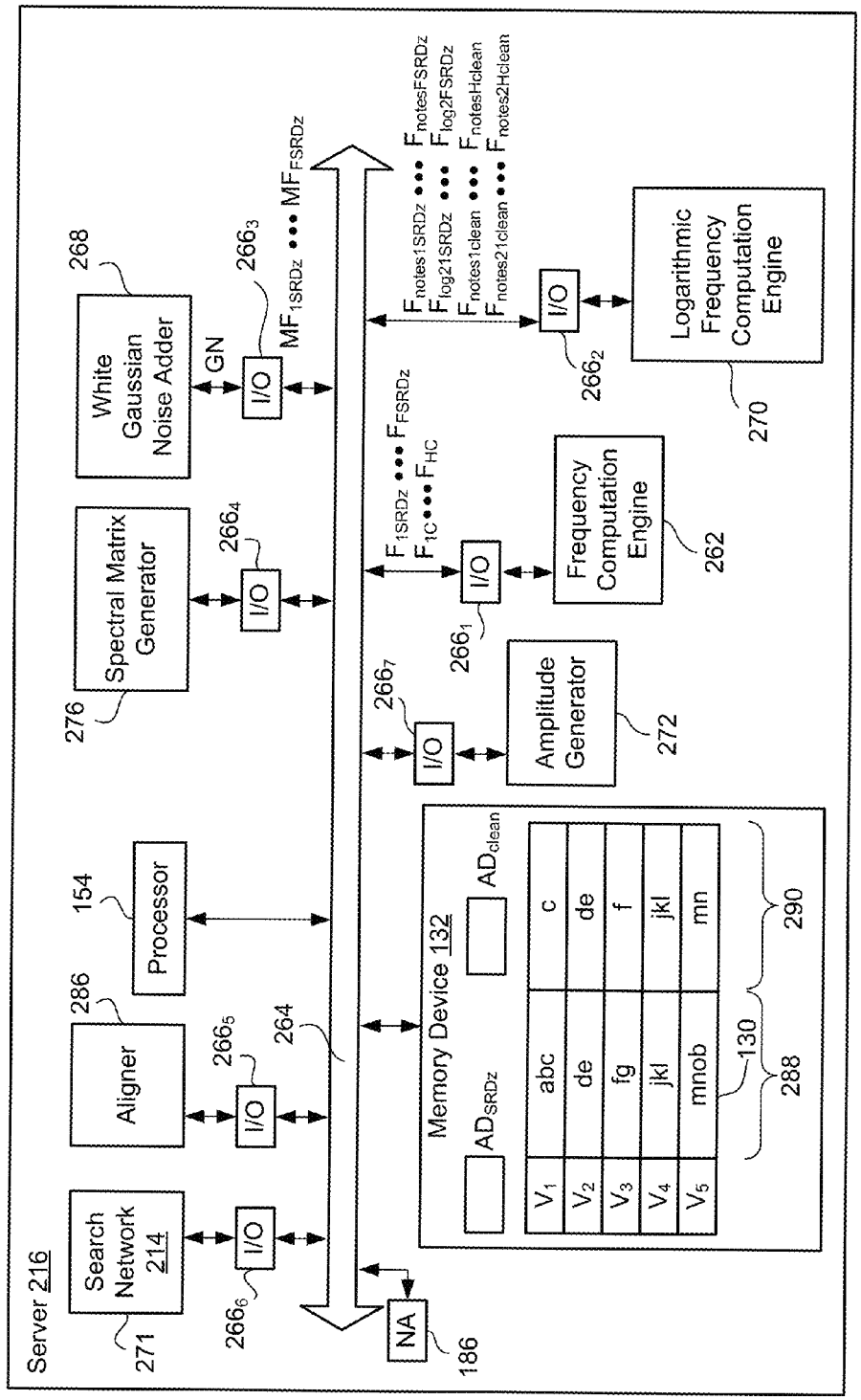
FIG. 4 is a block diagram of an embodiment of a server that generates phonemes, in accordance with an embodiment of the invention.

FIG. 4 is a block diagram of an embodiment of the server 216 that generates phonemes. Network adapter 186 receives audio data, such as audio data $AD_{SRDz}$ and the clean audio data $AD_{clean}$, from the network 107 and stores the audio data within the memory device 132.

An amplitude generator 272 detects amplitudes from audio data that is stored in the memory device 132. For example, the amplitude generator 272 determines amplitudes of the audio data $AD_{SRDz}$. As another example, the amplitude generator 272 determines amplitudes of the clean audio data $AD_{clean}$.

Moreover, a frequency computation engine 262 applies a time domain to frequency domain conversion to compute energies in each frequency bin that has a range of frequencies. The energies are computed from the amplitude data that is stored within memory device 132. For example, the frequency computation engine 262 generates frequencies $F_{1SRDz}$ thru $F_{FSRDz}$ from the audio data $AD_{SRDz}$, where the subscript F is a real number. As another example, the frequency computation engine 262 converts the clean audio data $AD_{clean}$ from the time domain to the frequency domain to generate the frequencies $F_{1C}$ thru $F_{HC}$, where H is a real number. The frequency computation engine 262 is coupled with a bus 264 via an input/output (I/O) interface $266_1$.

In some embodiments, a white Gaussian noise adder 268 adds a white Gaussian noise to the frequencies that are generated by the frequency computation engine 262 to generate modified frequencies $MF_{1SRDz}$ thru $MF_{1SRDz}$. For example, frequencies that represent the white Gaussian noise are added to the frequencies $F_{1SRDz}$ thru $F_{FSRDz}$ to generate the modified frequencies $MF_{1SRDz}$ thru $MF_{1SRDz}$.

A logarithmic frequency computation engine 270 generates logarithmic frequencies from the frequencies that are generated by the frequency computation engine 262. For example, the logarithmic frequency computation engine 270 applies the equation (1) to the frequencies $F_{1SRDz}$ thru $F_{FSRDz}$ to generate the logarithmic frequencies $F_{notes1SRDz}$ thru $F_{notesFSRDz}$. As another example, the logarithmic frequency computation engine 270 applies the equation (2) to the frequencies $F_{1SRDz}$ thru $F_{FSRDz}$ to generate the logarithmic frequencies $F_{log\ 21SRDz}$ thru $F_{log\ 21FSRDz}$. As another example, the logarithmic frequency computation engine 270 applies the equation (1) to the frequencies $F_{1C}$ thru $F_{HC}$ to generate the logarithmic frequencies $F_{notes1clean}$ thru $F_{notesHclean}$. As another example, the logarithmic frequency computation engine 270 applies the equation (2) to the frequencies $F_{1C}$ thru $F_{HC}$ to generate the logarithmic frequencies $F_{log\ 21clean}$ thru $F_{log\ 2Hclean}$.

In the embodiments in which the modified frequencies are used, the logarithmic frequency computation engine 270 generates logarithmic frequencies from the modified frequencies that are generated by the white Gaussian noise adder 268. For example, the logarithmic frequency computation engine 270 applies the equation (1) to the modified frequencies $MF_{1SRDz}$ thru $MF_{1SRDz}$ to generate logarithmic frequencies. As another example, the logarithmic frequency computation engine 270 applies the equation (2) to the modified frequencies $MF_{1SRDz}$ thru $MF_{1SRDz}$ to generate logarithmic frequencies.

Figure 5A:
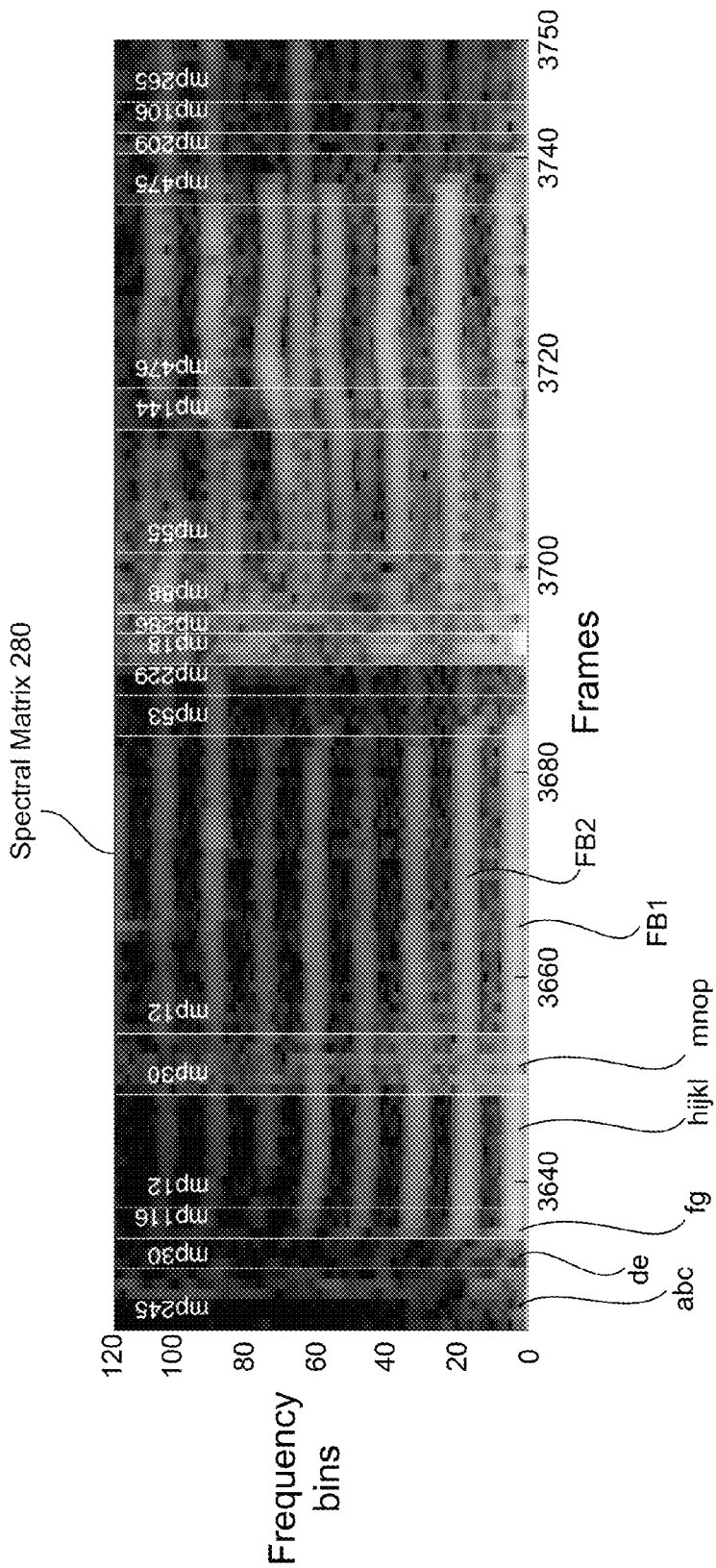
FIG. 5A is an example of a spectral matrix, in accordance with an embodiment of the invention.

A spectral matrix generator 276 generates a spectral matrix from logarithmic frequencies that are generated by the logarithmic frequency computation engine 270. For example, the spectral matrix generator 276 generates a function between time frames and logarithmic frequencies that are provided by the logarithmic frequency computation engine 270. An example of a spectral matrix 280 is shown below in FIG. 5A. In the spectral matrix 280, logarithmic frequencies that are provided by the logarithmic frequency computation engine 270 are sorted in frequency bins, such as frequency bins $FB_1$ and $FB_2$ to provide the logarithmic frequencies as a function of time frames. As illustrated in FIG. 5A, a number of frequency bin ranges from 0 to 120 and time frames range from 0 to 3750. As another example, the spectral matrix generator 276 generates a spectral matrix from the logarithmic frequencies $F_{notes1clean}$ thru $F_{notesHclean}$ or the logarithmic frequencies $F_{log\ 21clean}$ thru $F_{log\ 2Hclean}$. As yet another example, the spectral matrix generator 276 generates a spectral matrix from the logarithmic frequencies $F_{notes1SRDz}$ thru $F_{notesFSRDz}$ or the logarithmic frequencies $F_{log\ 21SRDz}$ thru $F_{log\ 21FSRDz}$. As another example, the spectral matrix generator 276 generates a spectral matrix from logarithmic frequencies that are generated from the modified frequencies $MF_{1SRDz}$ thru $MF_{1SRDz}$.

Referring back to FIG. 4, the processor 154 determines feature vectors from a spectral matrix. For example, the processor 154 executes the feature generator 206 to determine values of logarithmic frequencies at a time frame. As another example, referring to FIG. 5A, the processor 154 executes the feature generator 206 to determine multiple values "a" of logarithmic frequencies at a time frame, to determine multiple values "b" of logarithmic frequencies at another time frame, to determine multiple values "c" of logarithmic frequencies at yet another time frame, and so on until to determine multiple values "p" of logarithmic frequencies at a different time frame.

Moreover, the processor 154 executes the acoustic model 210 to generate phonemes from feature vectors that are computed by the feature vector generator 206 (FIG. 1). For example, the processor 154 partitions feature vectors, such as the feature vectors "abcdefghijklmnop" or "cdefjklmn", into phonemes based on a parameter of music 118 (FIG. 1). Each partition includes logarithmic values over one or more time frames. In this example, the processor 154 determines that a sequence of one or more feature vectors represents a value of a parameter of music 118 and designates the sequence as a phoneme, such as the phoneme "abc", which is illustrated in FIG. 5A. Moreover, in this example, the processor 154 determines that another sequence of one or more feature vectors represents a value of the same or another parameter of music 118 and designates the other sequence as another phoneme, such as phoneme "de", which is illustrated in FIG. 5A. As another example, the processor 154 determines that a sequence of one or more feature vectors represents a set of two or more values of a parameter of music 118 and designates the set as a phoneme. Moreover, in this example, the processor 154 determines that another sequence of one or more feature vectors represents another set of one or more values of the same or another parameter of music 118 and designates the other sequence as another phoneme. In this example, the other set includes different values than the values of the set. It should be noted that the processor 154 determines values of parameters, as described above, from amplitudes generated by the amplitude generator 272 and frequencies generated by the frequency computation engine 262.

An aligner 286 aligns phonemes generated from the clean audio data $AD_{clean}$ with phonemes generated from the audio data $AD_{SRDz}$ based on values of parameters. For example, the aligner 286 determines that the phoneme "abc" is generated from a set of amplitudes and/or frequencies that are also used to generate a value $V_1$ of parameter of music 118. In this example, the aligner 286 also determines that the amplitudes and/or frequencies are generated from the audio data $AD_{SRDz}$. Moreover, in this example, the aligner 286 determines that the phoneme "c" is generated from an additional set of amplitudes and/or frequencies that are also used to generate the value $V_1$ of parameter of music 118. In this example, the aligner 286 also determines that the amplitudes and/or frequencies of the additional set are generated from the clean audio data $AD_{clean}$. In this example, upon determining that the phonemes "abc" and "c" are generated from amplitudes and/or frequencies that are used to generate the value $V_1$, the aligner 286 determines that the phoneme "c" be aligned with the phoneme "abc" in a database 130 of the memory device 132.

In some embodiments, the feature vector "a" in the phoneme "abc" represents a combination of audio data $AD_{SRDz}$ and white Gaussian noise that is added by the white Gaussian noise adder 268, and the feature vector "b" within the phoneme "abc" represents environmental noise of an environment in which music 118 is recorded by the recording device $SRD_z$ (FIG. 3).

Similarly, as another example, the aligner 286 aligns the phoneme "de" that is generated from the clean audio data $AD_{clean}$ with the phoneme "de" that is generated from the audio data $SRD_z$ based on a value $V_2$ of a parameter. Moreover, as another example, the phonemes "fg" and "f" are aligned based on a value $V_3$ of a parameter, the phonemes "jkl" and "jkl" are aligned based on a value $V_4$ of a parameter, and the phonemes "mnop" and "mn" are aligned based on a value $V_5$ of a parameter. It should be noted that phonemes within a column 288 of the database 130 are generated from the audio data $AD_{SRDz}$ and phonemes within a column 290 of the database 130 are generated from the clean audio data $AD_{clean}$.

The phonemes within the column 288 are generated by the acoustic model 210. For example, the phonemes within the column 288 are illustrations of phonemes $Pi_1$ thru $Pi_B$ that are generated by the acoustic model 210. As another example, the phoneme "$Pi_1$" is the same as the phoneme "abc", the phoneme "de" is the same as the phoneme "$Pi_2$", the phoneme "fg" is the same as the phoneme "$Pi_3$", the phoneme "jkl" is the same as the phoneme "$Pi_4$", and the phoneme "$Pi_5$" is the same as the phoneme "mnop".

In some embodiments, the feature vectors "o" and "p" in the phoneme "mnop" represent a mixture of the audio data $AD_{SRDz}$ and white Gaussian noise that is added by the white Gaussian noise adder 268, environmental noise of an environment in which music 118 is recorded by the recording device $SRD_z$ (FIG. 3), or a combination thereof. In various embodiments, the feature vector "g" in the phoneme "fg" represents a mixture of the audio data $AD_{SRDz}$ and white Gaussian noise that is added by the white Gaussian noise adder 268, environmental noise of an environment in which music 118 is recorded by the recording device $SRD_z$ (FIG. 3), or a combination thereof.

As shown, the logarithmic frequency computation engine 270, the white Gaussian noise adder 268, the spectral matrix generator 276, the aligner 286, the search network 214 and the amplitude generator 272 are coupled with the bus 264 via respective I/O interfaces $266_2$, $266_3$, $266_4$, $266_5$, $266_6$, and $266_7$. It should be noted that an I/O interface provides compatibility between a respective module that is coupled with the I/O interface and a bus that is coupled with the I/O interface. In some embodiments, an I/O interface includes one or more buffers. For example, the I/O interface $266_1$ includes one or more buffers to store data to match a speed of communication of the frequency computation engine 262 with a speed of communication of the bus 264. As another example, the I/O interface $266_2$ converts a protocol used by the logarithmic frequency computation engine 270 to a protocol used by the bus 264 and vice versa.

It should be noted that in some embodiments, the aligner 286, the spectral matrix generator 276, the white Gaussian noise adder 268, the logarithmic frequency computation engine 270, the frequency computation engine 262, and the amplitude generator 272 are modules that are executed by the processor 154 to perform the functions, described herein, as performed by the modules. In other embodiments, the functions performed by the modules are performed by more than one processor of one or more servers. A module, as used herein, is a computer-readable code or a portion of a computer-readable code.

In other embodiments, one or more of the aligner 286, the spectral matrix generator 276, the white Gaussian noise adder 268, the logarithmic frequency computation engine 270, the frequency computation engine 262, and the amplitude generator 272 are implemented as one or more programmable logic devices (PLDs), such as ASICs and FPGAs, and the remaining of the modules are implemented as a computer-readable code or a portion of the computer-readable code. In several embodiments, any of the values $V_1$ thru $V_5$ represents a set of values of a parameter of music 118 rather than a single value of the parameter.

Figure 5B:
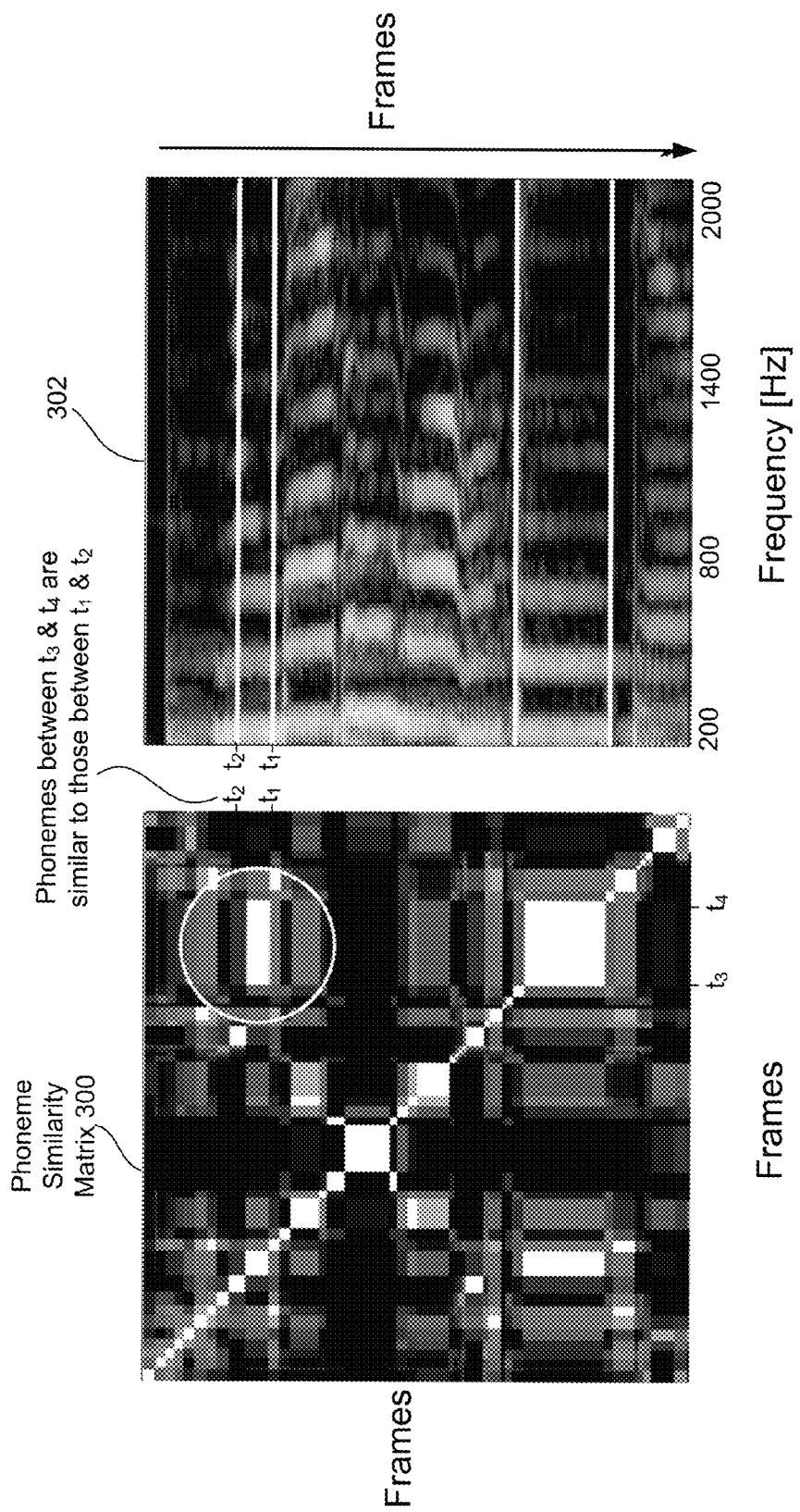
FIG. 5B is a diagram that includes a covariance matrix and a spectrogram, in accordance with an embodiment of the invention.

FIG. 5B is a diagram that shows an embodiment of a phoneme similarity matrix 300 and an embodiment of a spectrogram 302. The spectrogram 302 shows logarithmic frequencies generated from audio data, such as the audio data $AD_{clean}$ or the audio data $AD_{SRDz}$, versus time frames. The phoneme similarity matrix 300 shows a three-dimensional graph in which phoneme similarity values are plotted in a first dimension, time frames are plotted in a second dimension, and the time frames are plotted in a third dimension.

It should be noted that there is similarity between phonemes between time frames $t_1$ and $t_2$ and phonemes between time frames $t_3$ and $t_4$. For example, phonemes between time frames $t_3$ and $t_4$ indicate that a chorus same as that between time frames $t_1$ and $t_2$ is repeated twice between time frames $t_3$ and $t_4$. The similarity is also evident in the spectrogram 302. In some embodiments, the processor 154 determines the similarity by applying a Kullback-Leibler divergence to a phoneme that is represented within the time frame $t_1$ and $t_2$ and another phoneme that is represented between the time frames $t_3$ and $t_4$. For example, the processor 154 determines Gaussian Mixture Models (GMMs) based on the phoneme that is represented within the time frame $t_1$ and $t_2$ and the phoneme that is represented between the time frames $t_3$ and $t_4$, and determines similarity between the GMMs to determine similarity between the phonemes.

Figure 6:
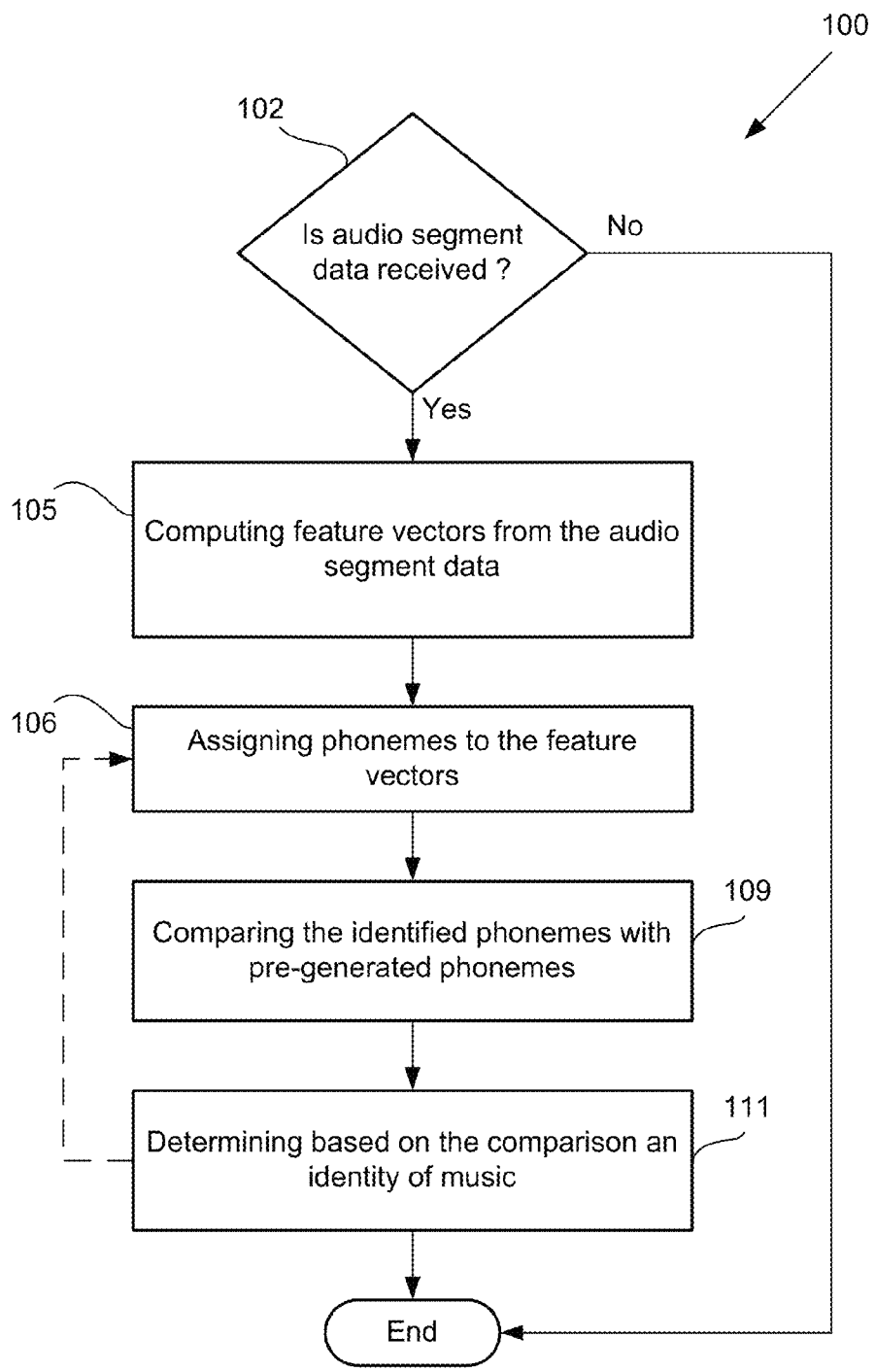
FIG. 6 is a flowchart of an embodiment of a method for determining an identity of music, in accordance with one embodiment of the present invention.

FIG. 6 is a flowchart of an embodiment of a method 100 for determining an identity of music that includes the portion 103. The method 100 is performed by one or more processors of one or more servers, such as by the processor 154 of the server 216.

In operation 102, a processor of the network adapter 186 (FIG. 1) determines whether the audio segment data 104 is received from the network 107 (FIG. 1). Upon determining that the audio segment data 104 is not received, the method 100 ends. On the other hand, upon determining that the audio segment data 104 is received, in operation 105, feature vectors are computed from the audio segment data 104. The feature vectors are computed from the audio segment data 104 in a similar manner in which the feature vectors "abdcdefghikjlmnop" are computed from the first set of audio data, as described above with reference to FIG. 2.

In operation 106, the phonemes $Pi_3$, $Pi_1$, and $Pi_7$ are assigned to the feature vectors that are computed in the operation 105, and the phonemes $Pi_3$, $Pi_1$, and $Pi_7$ are assigned, by the search network 214, from the phonemes $Pi_1$ thru $Pi_B$. It should be noted that one or more of phonemes $Pi_1$ thru $Pi_B$ are labeled by the acoustic model 210 as being likely to match feature vectors that are computed in operation 105. Moreover, in operation 109, the search network 214 (FIG. 1) compares an order of occurrence of the identified phonemes $Pi_3$, $Pi_1$, and $Pi_7$ with an order of occurrence of phonemes of the pre-assigned phoneme sequences, which are sequences of the phonemes stored in the database 218, and in operation 111, an identity of the music that includes the portion 103 is determined based on the comparison. For example, a probability of match between an order of occurrence of the identified phonemes $Pi_3$, $Pi_1$, and $Pi_7$ and an order of occurrence of the phonemes $Pi_3$, $Pi_1$, and $Pi_7$ that are stored in the database 218 is determined. Upon receiving a determination that the probability is high, the music identifier 224 determines that the music that includes the portion 103 has the identification $ID_2$.

On the other hand, upon determining that the probability of match between an order of occurrence of the identified phonemes $Pi_3$, $Pi_1$, and $Pi_7$ and an order of occurrence of phonemes within a set of phonemes that is associated with one of the identifications $ID_1$ thru $ID_M$ of music is low, the search network 214 assigns another set of one or more phonemes to the feature vectors that are computed from the audio segment data ASD 104. Upon receiving the other set of phonemes, the search network 214 determines whether there is a high probability of match between an order of occurrence of the phonemes of the other set and an order of occurrence of a set of phonemes that is associated with one of the identifications $ID_1$ thru $ID_M$ of music. Upon receiving a determination that the probability is high with respect to the order of occurrence of phonemes of the other set, music identifier 224 (FIG. 1) determines one of the identifications $ID_1$ thru $ID_M$ of music that includes the portion 103 and the identification is associated with an order of occurrence of a set of phonemes within the database 218.

One of the identifications $ID_1$ thru $ID_M$ of music is associated with an order of occurrence of a set of phonemes within the database 218 when the order is unique to the identification. For example, an order of occurrence of phonemes $Pi_7$, $Pi_3$, and $Pi_1$ that identifies music with identification $ID_2$ instead of the remaining music with remaining identifications $ID_1$ and $ID_3$ thru $ID_M$ is unique to the identification $ID_2$. It should be noted that the high probability is higher than the low probability. In some embodiments, the high probability is a pre-determined probability, such as greater than 25 or 50 percent, and the low probability is a pre-determined probability, such as less than or equal to 25 or 50 percent.

In other embodiments, instead of comparing an order of occurrence of the identified phonemes $Pi_3$, $Pi_1$, and $Pi_7$, the identified phonemes are compared with the pre-assigned phonemes that are stored in database 218. Moreover, in these embodiments, an identity of the music that includes the portion 103 is determined based on the comparison. For example, a probability of match between the identified phonemes $Pi_3$, $Pi_1$, and $Pi_7$ and the phonemes $Pi_3$, $Pi_1$, and $Pi_7$ that are stored in the database 218 is determined independent of an order of occurrence of the identified and the pre-assigned phonemes. Upon determining that the probability is high, it is determined that the music that includes the portion 103 has the identification $ID_2$.

In these embodiments, on the other hand, upon determining that the probability of match between the identified phonemes $Pi_3$, $Pi_1$, and $Pi_7$ and phonemes within a set of phonemes that is associated with one of the identifications $ID_1$ thru $ID_M$ of music is low, the search network 214 (FIG. 1) assigns another set of one or more phonemes to the feature vectors that are computed from the audio segment data ASD 104. Upon receiving the other set of phonemes, the search network 214 determines whether there is a high probability of match between the phonemes of the other set and a set of pre-assigned phonemes that is associated with one of the identifications $ID_1$ thru $ID_M$ of music independent of an order of occurrence of the identified and the pre-assigned phonemes. Upon determining that the probability is high with respect to the phonemes of the other set, the search network 214 determines one of the identifications $ID_1$ thru $ID_M$ of music that includes the portion 103.

In these embodiments, one of the identifications $ID_1$ thru $ID_M$ of music is associated with a set of phonemes within the database 218 when the set is unique to the identification regardless of the order of occurrence of the identified phonemes and the pre-assigned phonemes. For example, the phonemes $Pi_7$, $Pi_3$, and $Pi_1$ that identifies music with identification $ID_2$ instead of the remaining music with remaining identifications $ID_1$ and $ID3$ thru $ID_M$ is unique to the identification $ID_2$.

In some embodiments, a weighted approach is used to determine an identity of music that includes the portion 103. For example, the processor 154 assigns a weight to each identified and pre-assigned phoneme based on a parameter that is represented by the phonemes. For example, if the identified and pre-assigned phoneme $Pi_3$ represents a lyric, a higher weight is assigned to the phoneme $Pi_3$ and if the identified and pre-assigned phoneme $Pi_1$ represents a pitch, a lower weight is assigned to the phoneme $Pi_1$. The processor 154 determines whether in case of a match between the identified phonemes and pre-assigned phonemes that identifies music that includes the portion 103, a weight of the identified phonemes exceeds a pre-determined weight. If so, the processor 154 determines that the music that includes the portion 103 is identified. On the other hand, if the weight of the identified phonemes does not exceed the pre-determined weight, the processor 154 determines to generate another set of identified phonemes from the feature vectors that are computed from the portion 103.

It should be noted that in some embodiments, the operations 106, 109, and 111 are performed concurrently or at approximately the same time. The concurrence is illustrated by the dashed arrow in FIG. 6. In other embodiments, the operations 106, 109, and 111 are performed sequentially.

Figure 7:
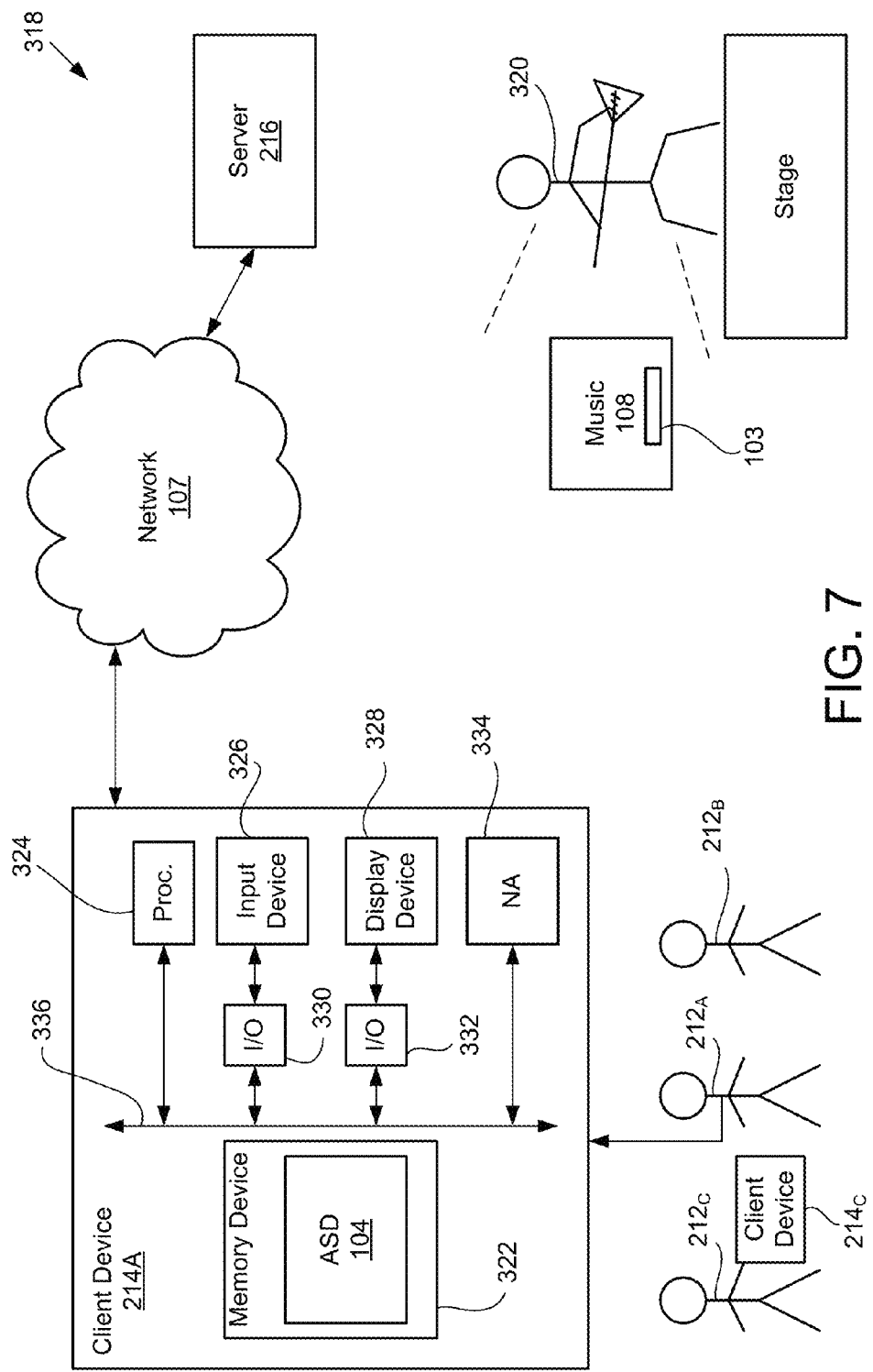
FIG. 7 is a diagram of an embodiment of a system that is used to illustrate a noisy environment, in accordance with an embodiment of the invention.

FIG. 7 is a diagram of an embodiment of a system 318 that is used to illustrate a noisy environment. A user 320 is hosting a concert in which the user 320 is singing on stage and playing a musical instrument to generate music 108. In some embodiments, the user 320 is singing or playing a musical instrument to generate music 108. Users 212 are enjoying the music 108. A noisy environment is created by various factors, such as talk between the users $212_A$ and 212B, the user $212_C$'s client device $214_C$ ringing, and a distance between the user 320 and the client device $214_A$. Noise increases within an increase in distance between the user 320 and the client device $214_A$. The user $212_A$ likes the music 108 but cannot recognize the music 108. For example, it is difficult for the user $212_A$ to recognize the lyrics of music 108, to recognize a title of the music 108, to recognize a name of the user 320, or an album of the music 108. The user $212_A$ records the portion 103 in a memory device 322 of his/her client device $214_A$ in the form of audio segment data ASD 104.

The client device 214A includes a processor 324, an input device 326, a display device 328, a network adapter 334 and a bus 336. Examples of an input device include a keyboard, a mouse, a trackball, a stylus, and a touchscreen. The input device 326 is coupled with the bus 336 via an I/O interface 330 and the display device 328 is coupled with the bus 336 via an I/O interface 332. Also, the network adapter 334, the processor 324, and the memory device 322 are coupled with the bus 336. The memory device 322 is part of a sound recording device of the client device 214A. The network adapter 334 sends the audio segment data 104 via the network 107 to the server 216.

Figure 8:
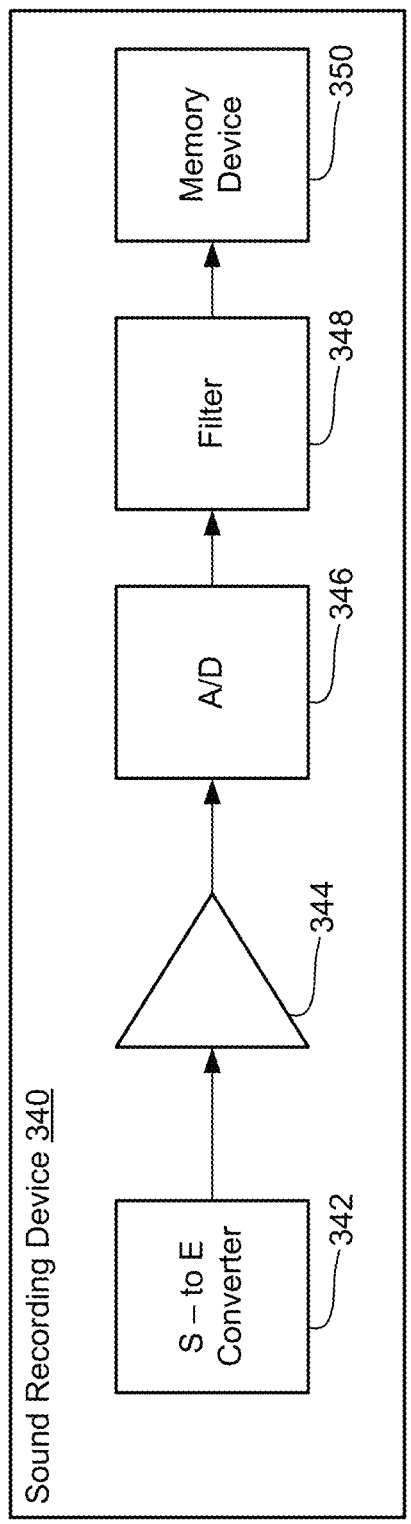
FIG. 8 is a block diagram of a sound recording device, in accordance with an embodiment of the invention.

FIG. 8 is a block diagram of an embodiment of a sound recording device 340. In some embodiments, the sound recording device 320 is an example of a sound recording device within a client device. In other embodiments, the sound recording device 340 is an example of any of the sound recording devices $SRD_1$ thru $SRD_z$.

A sound to electrical energy converter 342 converts sound energy within music into electrical energy to generate electrical signals. An amplifier 344 amplifies the electrical signals to generate amplified electrical signals. An analog-to-digital converter 346 samples the amplified electrical signals to generate samples. As an example, the analog-to-digital converter 346 samples at a rate of 16 kilohertz (kHz). As another example, the analog-to-digital converter 346 samples at a rate between 12 kHz and 18 kHz. A filter 348 filters the samples to generate filtered samples, which are stored as audio data within the memory device 350. In some embodiments, the sound recording device 340 excludes the amplifier 344 and/or the filter 348.

Embodiments of the present invention can be fabricated as computer-readable code on a non-transitory computer-readable storage medium, which is a storage device or a memory device. The non-transitory computer-readable storage medium holds data, which can be read by a computer system. Examples of the non-transitory computer-readable storage medium include network attached storage (NAS), ROM, RAM, a combination of RAM and ROM, Compact Discs (CD), Blu-ray™ discs, flash drives, hard drives, magnetic tapes, and other data storage devices. The non-transitory computer-readable storage medium may be distributed over a network-coupled computer system so that the computer-readable code is stored and executed in a distributed fashion.

Although the method operations were described in a specific order, it should be understood that some operations may be performed in a different order, when the order of the operations do not affect the expected results. For example, in the method 141 of FIG. 2, the operations 147 and 148 are performed before performing the operations 145 and 146. As another example, the operations 144 thru 147 are performed in an order of 145, 147, 146, and 148. In addition, other operations may be included in the methods presented, and the operations may be performed by different entities in a distributed fashion, as long as the processing of the operations is performed in a desired way.

In addition, at least one operation of some methods performs physical manipulation of physical quantities, and some of the operations described herein are useful machine operations. Embodiments presented herein recite a device or apparatus. The apparatus is specially constructed for the required purpose. The apparatus includes a processor capable of executing the program instructions of the computer programs presented herein.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the appended claims.

What is claimed is:

1. A method, comprising:
   receiving, by a device comprising a processor, audio segment data generated from a portion of music captured in a first environment;
   generating one or more feature vectors from the audio segment data;
   identifying one or more phonemes from the one or more feature vectors;
   comparing the identified one or more phonemes with one or more pre-assigned phoneme sequences identifying one or more respective known music pieces; and
   determining an identity of the music based on the comparison,
      wherein one or more recordings of the music are generated by recording one or more portions of the music with one or more sound recording devices,
      wherein the one or more sound recordings are placed at different locations relative to a location of a playback device, and
      wherein the identifying one or more phonemes from the one or more feature vectors comprises:
         comparing at least one of the one or more feature vectors with one or more stored phonemes, wherein the one or more stored phenomes are stored in a database and generated based on the one or more recordings of the music; and
         identifying the one or more phonemes based on a match between the at least one of the one or more feature vectors and at least one of the one or more stored phonemes.

2. The method of claim 1, wherein the receiving the audio segment data comprises receiving the audio segment data via a network, the method further comprising storing the audio segment data in a memory device.

3. The method of claim 1, wherein the first environment comprises a live source of the music or a playback of a live source of the music.

4. The method of claim 1, wherein the generating the one or more feature vectors comprises:
   generating a frequency spectrum of the audio segment data; and
   calculating a log of frequencies in the frequency spectrum.

5. The method of claim 4, further comprising:
   generating multiple frequency bins as a function of time frames from the log of frequencies; and
   generating the one or more feature vectors by determining the one or more feature vectors as a portion of the multiple frequency bins, wherein the one or more feature vectors are measured at a single time frame.

6. The method of claim 1, wherein the one or more stored phonemes are generated based on portions of multiple frequency bins that span multiple time frames, wherein the multiple frequency bins are generated from logarithms of frequencies generated from the one or more recordings.

7. The method of claim 1, wherein the one or more recordings comprises a first recording on a memory device and a plurality of recordings on music recording devices.

8. The method of claim 7, wherein the first recording is used to generate a first set of phonemes and one of the plurality of recordings on the music recording devices is used to generate a second set of phonemes, wherein one or more of the phonemes of the first set and one or more of the phonemes of the second set are aligned based on a parameter of the music, and wherein, after the alignment, the second set of phonemes is used as the one or more stored phonemes.

9. The method of claim 1, wherein the identified one or more phonemes are generated based on portions of multiple frequency bins that span multiple time frames, wherein the multiple frequency bins are generated from logarithms of modified frequencies, and wherein the modified frequencies are based on an addition of white Gaussian noise to frequencies generated from one or more recordings.

10. The method of claim 1, wherein the comparing the identified one or more phonemes with the one or more pre-assigned phoneme sequences comprises comparing the identified one or more phonemes with the one or more pre-assigned phoneme sequences generated based on one or more phonemes of an acoustic model, wherein the one or more pre-assigned phoneme sequences used to identify a first set of the music that is larger than a second set of the music associated with the one or more stored phonemes.

11. The method of claim 1, wherein the identified one or more phonemes represent at least one of a chorus, a musical instrument, a lyric, a pitch, a rhythm, a dynamic or a combination thereof.

12. The method of claim 1, further comprising re-identifying one or more phonemes from the one or more feature vectors in response to determining the identified one or more phonemes do not match any of the one or more pre-assigned phoneme sequences.

13. A method, comprising:
receiving, by a device comprising a processor, a first set of audio data generated from playback of music;
accessing a second set of audio data from a memory device;
generating a first sequence of feature vectors from the first set of audio data;
generating a first set of phonemes from the first sequence of feature vectors;
generating a second sequence of feature vectors from the second set of audio data;
generating a second set of phonemes from the second sequence of feature vectors;
aligning one or more of the second set of phonemes with one or more of the first set of phonemes based on associations of the first and second sequences of feature vectors with a parameter of the music; and
generating the database including the second set of aligned phonemes.

14. The method of claim 13, wherein the second set of audio data comprises clean audio data substantially without environmental noise and substantially without environmental noise and white Gaussian noise.

15. The method of claim 13, wherein the generating the first sequence of feature vectors comprises:
generating a first frequency spectrum from the first set of audio data, wherein the first frequency spectrum comprises a first set of frequencies;
calculating logarithms of the frequencies of the first set of frequencies to generate a first set of logarithmic frequencies;
generating a first set of multiple frequency bins as a function of time frames from the first set of logarithmic frequencies; and
determining the feature vectors of the first sequence as a first portion of the frequency bins of the first set of multiple frequency bins, wherein the first portion measured at a single time frame,
wherein the generating the first set of phonemes comprises determining the first set of phonemes as one or more of the first set of feature vectors,
wherein the generating the second sequence of feature vectors comprises:
generating a second frequency spectrum from the second set of audio data, wherein the second frequency spectrum comprises a second set of frequencies;
calculating logarithms of the second set of frequencies to generate a second set of logarithmic frequencies;
generating a second set of multiple frequency bins as a function of time frames from the second set of logarithmic frequencies; and
determining the feature vectors of the second sequence as a second portion of the frequency bins of the second set of multiple frequency bins, wherein the second portion is measured at a single time frame,
and wherein the generating the second set of phonemes comprises determining the second set of phonemes as one or more of the second sequence of feature vectors.

16. A system, comprising:
a network adapter configured to receive audio segment data generated from a portion of music captured in a first environment; and
a processor configured to:
generate one or more feature vectors from the audio segment data;
identify one or more phonemes from the one or more feature vectors;
compare the identified one or more phonemes with one or more pre-assigned phoneme sequences identifying respective known music pieces; and
determine an identity of the music based on the comparison, wherein one or more recordings of the music are generated by recording one or more portions of the music with one or more sound recording devices, and wherein the one or more sound recording devices are placed at different locations relative to a location of a playback device.

17. The system of claim 16, wherein the identified one or more phonemes comprises multiple frequencies that are a function of multiple time frames.

* * * * *